United States Patent [19]

Pechacek

[11] Patent Number: 4,820,384
[45] Date of Patent: Apr. 11, 1989

[54] REMOTELY OPERABLE VESSEL COVER POSITIONER

[76] Inventor: Raymond E. Pechacek, 1846 Latexo, Houston, Tex. 77018

[21] Appl. No.: 51,580

[22] Filed: May 18, 1987

[51] Int. Cl.[4] ..................... C10B 25/04; C10B 25/10
[52] U.S. Cl. ...................................... 202/245; 49/477;
49/485; 110/177; 202/252; 202/269; 220/239
[58] Field of Search .............. 202/242, 245, 250, 252,
202/269; 220/211, 239, 240, 319, 320, 321;
49/477, 485; 432/250; 126/190, 192, 197;
110/173 R, 176, 173 C, 177; 122/498

[56] References Cited

U.S. PATENT DOCUMENTS

| | | | |
|---|---|---|---|
| 871,421 | 11/1907 | Koppers | 202/248 |
| 976,931 | 11/1910 | Schniewind | 202/248 |
| 2,330,220 | 9/1943 | Kemper | 220/239 |
| 2,551,750 | 5/1951 | Liskey, Jr. | 49/477 |
| 2,662,053 | 12/1953 | Brown | 202/243 |
| 2,691,460 | 10/1954 | Barneby | 220/46 |
| 3,136,007 | 6/1964 | Maher et al. | 220/319 |
| 3,224,382 | 12/1965 | Floehr | 105/282 |
| 3,285,308 | 11/1966 | Stambaugh | 150/8 |
| 3,379,623 | 4/1968 | Forsyth | 202/252 |
| 3,500,584 | 3/1970 | Clery | 49/209 |
| 3,632,303 | 1/1972 | Aigner | 21/93 |
| 3,819,479 | 6/1974 | Jacquelin | 176/87 |
| 3,886,047 | 5/1975 | Billups, Jr. | 220/319 |
| 3,951,300 | 4/1976 | Kalasek | 220/319 |
| 4,033,828 | 7/1977 | Morrow | 202/248 |
| 4,054,411 | 10/1977 | Beck | 432/242 |
| 4,114,901 | 9/1978 | Pot | 277/34.3 |
| 4,126,520 | 11/1978 | Horster | 202/248 |
| 4,129,307 | 12/1978 | Nishiura | 277/34.3 |
| 4,152,216 | 5/1979 | Nishiura | 202/248 |
| 4,427,378 | 1/1984 | Bowers | 432/242 |
| 4,596,197 | 6/1986 | Kinzler | 110/173 |

*Primary Examiner*—Joye Woodard
*Attorney, Agent, or Firm*—Pravel, Gambrell, Hewitt, Kimball & Krieger

[57] ABSTRACT

This is an apparatus for attaching a removable cover to a large vessel. It is adaptable to existing vessels, especially those which have a mounting rim or flange. It uses multiple connector pins which are attached permanently to the vessel and which can be fastened to the cover assembly by a remote operation. It also uses fluid pressure to force the cover against the vessel opening, after which the cover is mechanically secured in place by a second remote operation.

14 Claims, 4 Drawing Sheets

REMOTELY OPERABLE VESSEL COVER POSITIONER

BACKGROUND OF THE INVENTION

1. Field of the Invention

This invention relates to the closure of large vessels which may operate under pressure and at high temperature.

2. Description of the Prior Art

The most common method for mounting doors, covers or other closure devices on such large vessels has been by bolting them to flanges on the vessel opening. Sealing, where required, is usually by use of various gaskets or O-rings. Removal and replacement of a bolted cover is a time-consuming operation. High temperature or pressure vessel closures are typically held in place by numerous bolts or studs and nuts. Removal of these bolts or nuts must generally be done by operators on site and thus it is sometimes necessary to wait for the vessel to cool before the closure can be removed.

Another method sometimes used to remove such a vessel cover involves the placement of some type of strong back or frame over the back of the closure and attaching the frame to the vessel thereby pressing the closure itself onto the opening. Such frames can be hinged or otherwise attached to reduce the number of bolts or other attachment devices necessary to hold the closure on the vessel opening. This method requires the sacrifice of some of the rigidity and sealing ability found in the aforementioned bolted flange system. Numerous cycles of operation can cause the cover itself to become warped or cause the sealing devices used to deteriorate so that a successful design must allow for these increased tolerances. Where the temperatures and pressures encountered will allow their use, inflatable seals are sometimes incorporated into either of these types of vessel closure designs in order to accommodate the warping and deterioration that will take place.

A device disclosed in U.S. Pat. No. 3,819,479 exhibits inflatable seals which can aid in sealing between the vessel flange and the closure plug and the flange of the plug. Some of these seals can also be inflated in order to lift the plug itself and allow its movement. This design incorporates a variation of the bolted flange with the plug assembly being bolted in place by use of a collar. The device disclosed in U.S. Pat. No. 871,421 exhibits an inflatable tube which exerts a force against a door and a door frame to seal the door against the vessel. The door is held in place by a separate locking device. The inflatable tube here is used to position the door for sealing by other devices rather than performing the sealing function itself. The invention disclosed in U.S. Pat. No. 3,632,303 exhibits a pressure hose which can be pressurized to exert force via a lever bar to force the closure against a seal. The attachment of the closure to the vessel is achieved by a variation of the normal bolting method. Local operation by hand is essential in attaching the closure to the vessel. The invention disclosed by U.S. Pat. No. 3,500,584 exhibits an inflatable seal which positions the closure against another seal with attachment of the closure being by means of a bolted apparatus. These and similar devices all suffer from the disadvantage of requiring local hand operation to attach or remove the closure and sometimes they sacrifice the strength of a bolted flange in order to reduce removal time, resulting in warpage or seal failure.

SUMMARY OF THE INVENTION

This invention is a remotely operable apparatus for installing and removing a vessel cover from a large vessel. It can be used with any vessel having a mounting rim around the opening or upon which such a rim could be installed. The apparatus uses specially shaped connector pins to align the cover with the opening and to attach the cover to the mounting rim. An incrementally rotating ring secures the cover to the connector pins, then an actuator which expands under fluid pressure is used to force the cover into its final position firmly against the vessel opening. A second rotating ring wedges the cover in its final position for the duration of the operating cycle of the vessel.

All these operations can be performed in remote, resulting in a high strength closure which can be quickly removed and replaced. This is only a summary of the invention; the full extent of the invention is reflected in the claims.

DETAILED DESCRIPTION OF THE INVENTION

Figure 1:
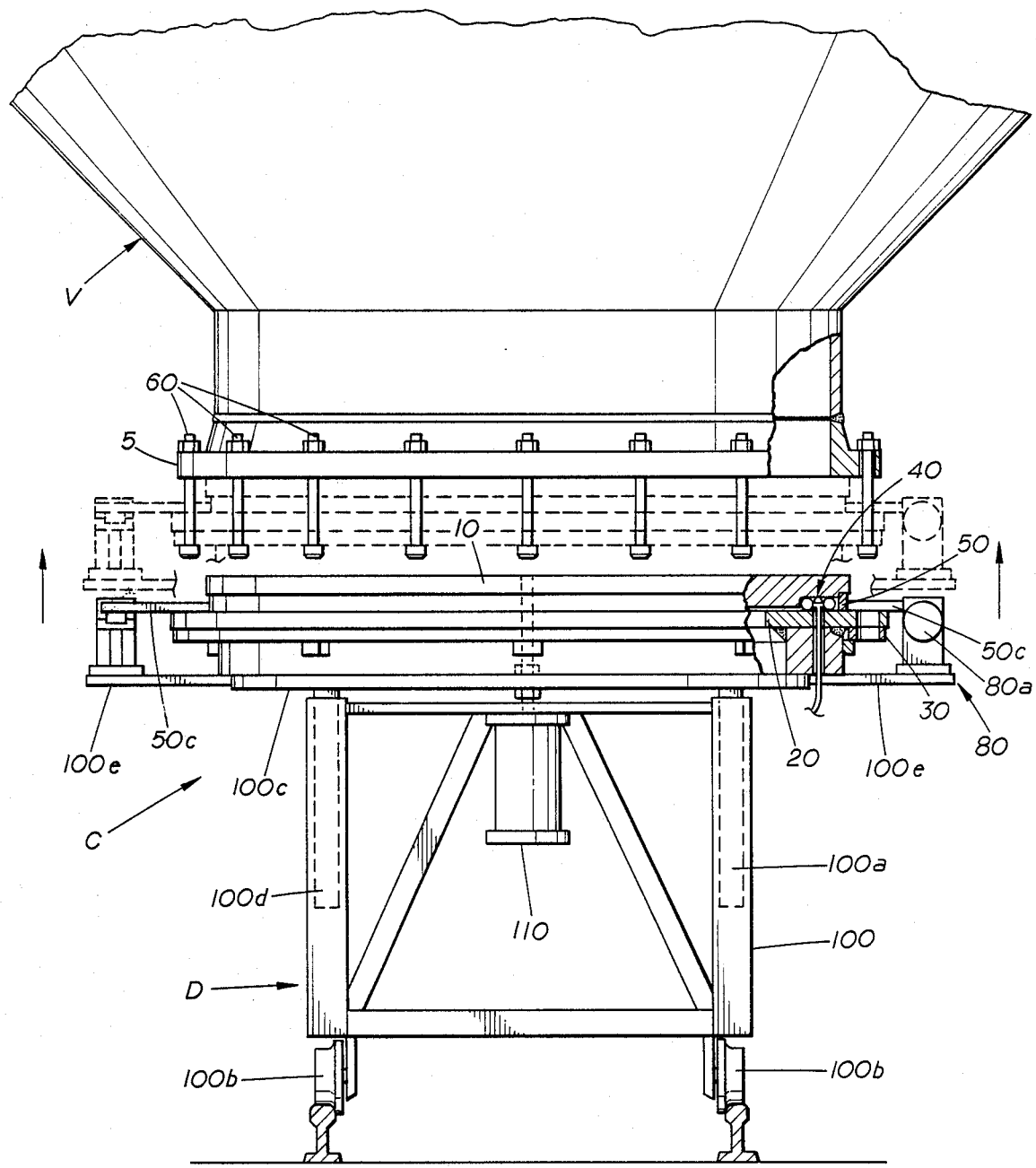
FIG. 1—elevation and partial section of the remotely operable vessel cover positioner of this invention illustrated with the vessel cover in raised and lowered positions.

The invention can readily be described as it is used on a typical coke oven or other vertical vessel with an opening on the bottom. Referring to FIG. 1, the vessel with which the invention is used is generally indicated as V. Such a vessel would typically be relatively large and have a vertical axis and legs or other supporting structure not shown in the figure. A cover positioner assembly, generally designated as C in FIG. 1, and including the cover 10, is generally attached to an opening in the vessel which is normally a round opening of large diameter. The means of attachment is by attaching the cover 10 to a mounting rim, in this case a flange 5, which surrounds the opening, and which has circumferentially spaced holes 5a. The vessel opening and the surrounding flange 5 is round in the preferred embodiment illustrated but may have other configurations.

The vessel is charged with a quantity of raw material and then heated and possibly maintained at an elevated pressure in performing the desired process, such as making coke. After the process is performed, the product is discharged by removing the cover 10 from the opening. A cart or dolly, generally designated as D in FIG. 1, is used to handle and transport the cover 10. This cart can take various forms, but it will typically have a framework 100 which includes legs 100a and wheels 100b which can roll on a track as illustrated or directly on the floor. The cart includes a platform or other supporting surface 100c upon which the cover assembly C rests. The platform 100c must be raised and lowered to install the cover assembly C on the flange 5 of vessel V, so it will typically have telescoping guide members 100d which can slide with relation to legs 100a while maintaining the stability of platform 100c. Attached to platform 100c are cylinder support brackets 100e which will indirectly interact with cover assembly C as explained later. The raising and lowering of platform 100c is made possible by mounting a fluid cylinder assembly or unit 110 on cart D which can be pressurized or depressurized to raise or lower platform 100c.

Figure 2:
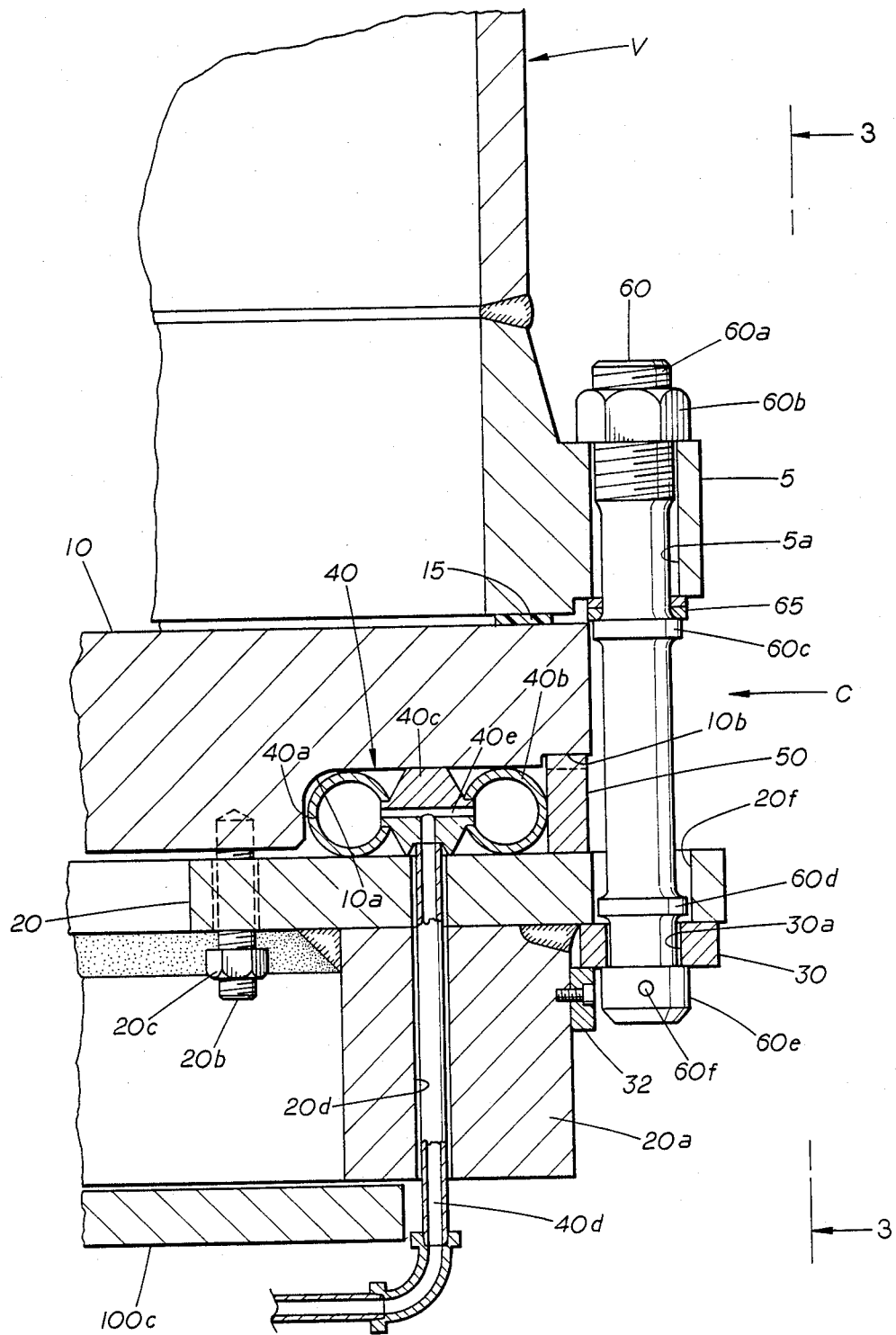
FIG. 2—detail of the apparatus of the invention.
Figure 3:
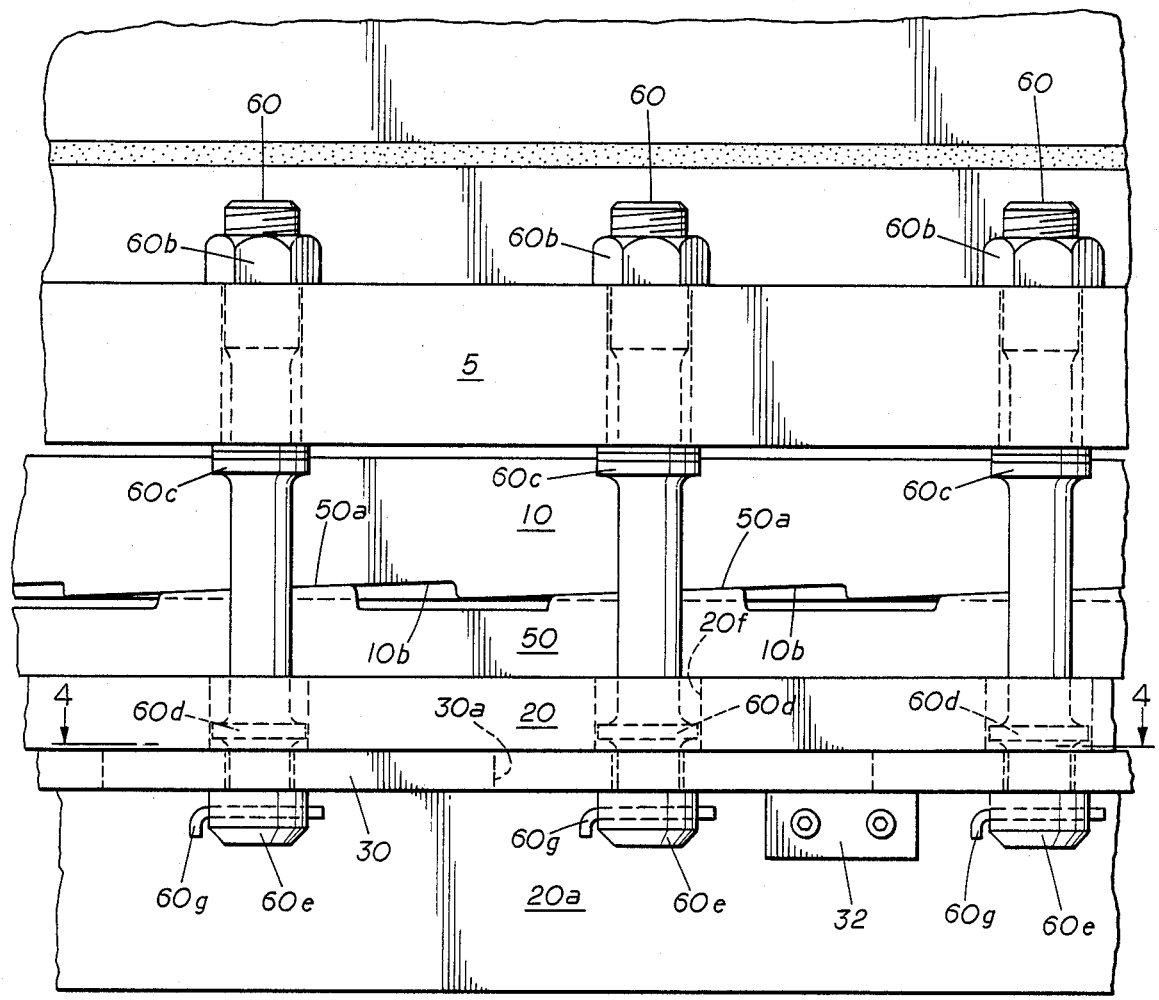
FIG. 3—elevation showing ramp ring of the invention rotated into contact position.

In order to look more closely at cover assembly C, refer to FIG. 2, where it will be seen that cover 10 mates with vessel flange 5 with the necessary seal being provided by gasket 15. Cover 10 is a circular disc which has two features machined into its lower side. Annular recess 10a is machined on the periphery of the cover to provide a location for force actuator 40 and ramp ring 50 which will be more fully described later. A plurality of ramps 10b, which can be seen in more detail in FIG. 3, are machined in the periphery of the cover 10 outside of the annular recess 10a, and they interact with ramp ring 50. Still referring to FIG. 2, the cover 10 rests indirectly upon force ring 20 which is an annular structure having an annular support block 20a. The annular support block 20a in turn rests upon platform 100c of framework 100 of cart D. The cover 10 is loosely attached to force ring 20 by studs 20b and nuts 20c. A passage 20d extends through the force ring 20, and block 20a in the proximity of force actuator 40. The holes 20f in force ring 20 align with holes 5a in vessel flange 5.

Figure 4:
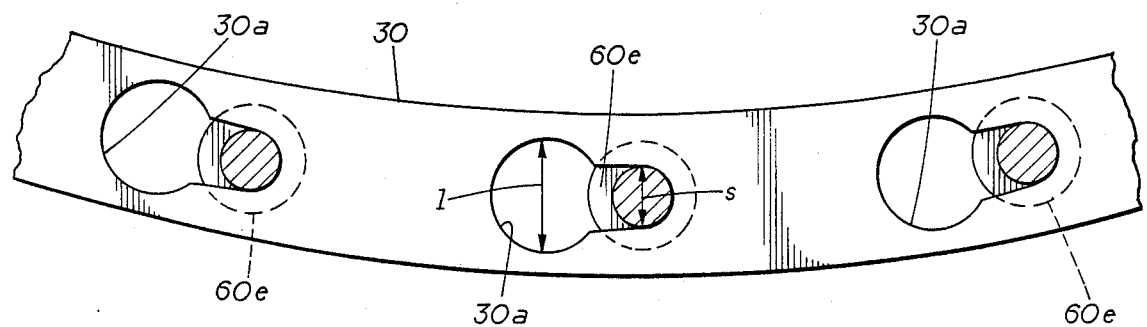
FIG. 4—detail of keyhole openings in lock ring.
Figure 5:
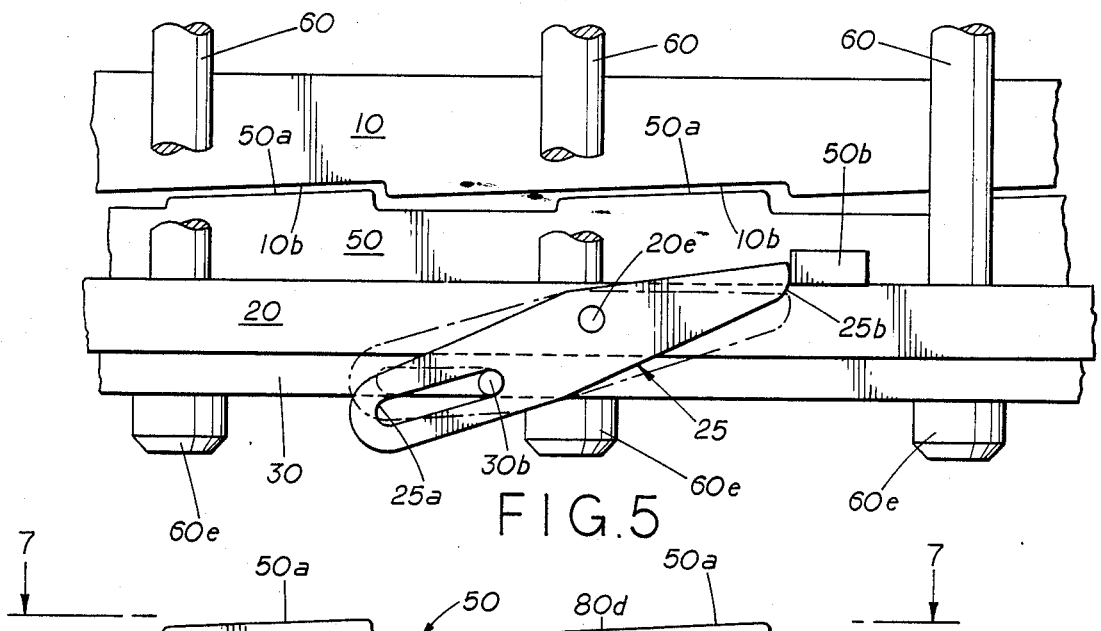
FIG. 5—elevation of safety latch.

The lock ring 30 is an annular structure having holes 30a, which are shown in more detail in FIG. 4, which align with holes 20f in force ring 20. Lock ring 30 is mounted for rotation by resting on support lugs 32 which are attached by screws or by welding to force ring support block 20a. Referring to FIG. 5, safety latch 25, having slot 25a is pivotally mounted to force ring 20 by pivot pin 20e. Latch pin 30b is mounted on lock ring 30 so as to engage slot 25a of safety latch 25.

Referring again to FIG. 2, force actuator 40 has radially inner annular ring 40a which has a tubular cross-section and which is positioned in recess 10a around the perimeter of cover 10. A similar ring with slightly larger diameter is radially outer annular ring 40b which also lies in recess 10a. The rings 40a and 40b are connected by an annular-pressure housing 40c around their entire circumference. Fluid pressure is introduced to pressure housing 40c by pressure tube 40d through force ring support block passage 20d and thence via passage 40e to rings 40a and 40b. The annular rings or tubular members 40a and 40b are metal but will expand sufficiently upon inflation by pressurized fluid to position the cover 10 with respect to the connector pins 60 as more fully described below.

Figure 6:
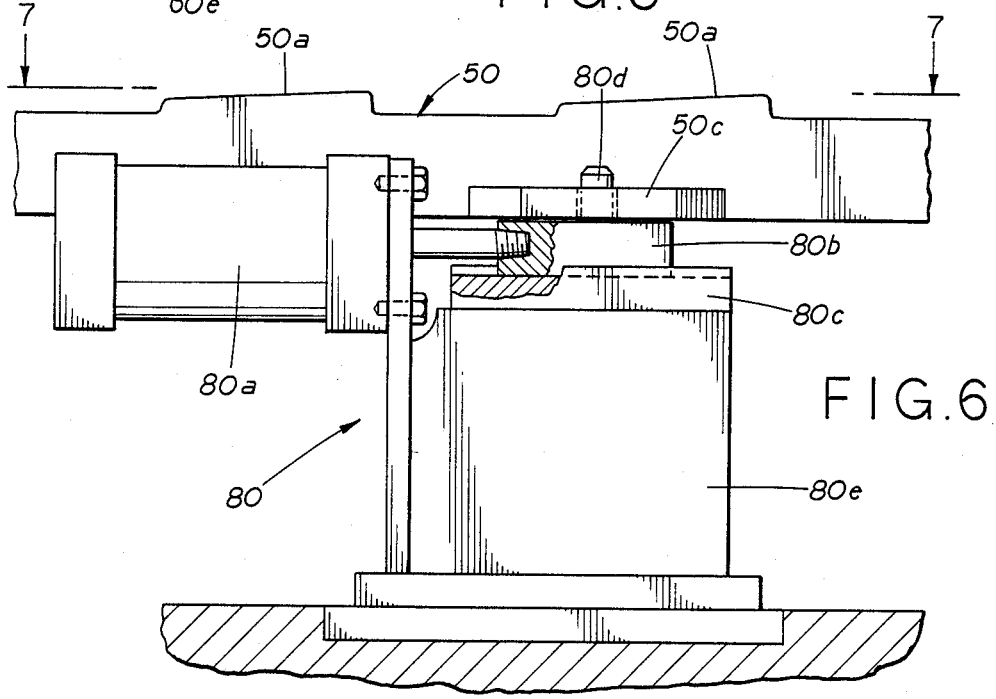
FIG. 6—elevation of apparatus for rotation.
Figure 7:
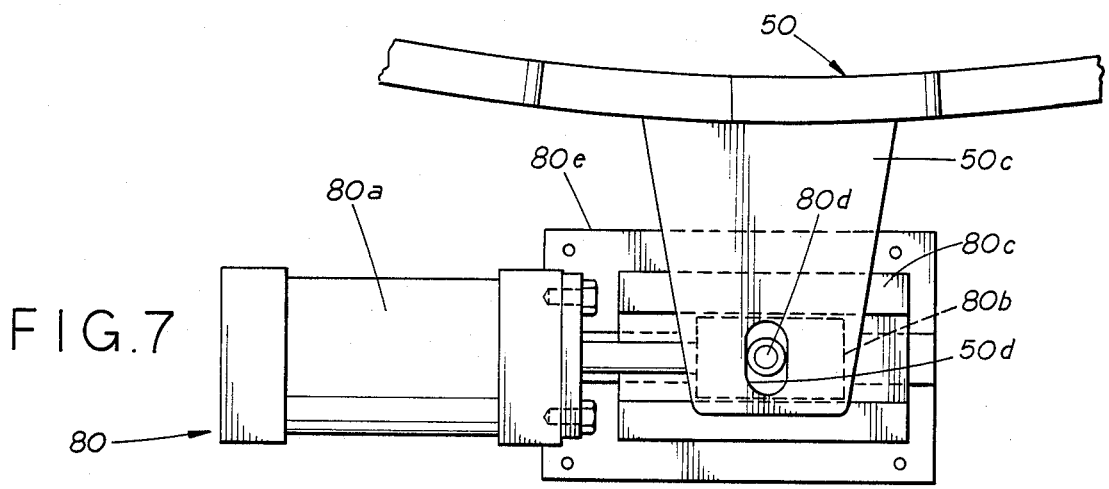
FIG. 7—plan view of apparatus for rotation, of FIG. 6.

Referring to FIG. 3, ramp ring 50 has on its upper surface ramps 50a which engage the matching ramps 10b on cover 10. Referring to FIG. 5, ramp ring 50 has latch lug 50b which can engage end 25b of safety latch 25. As can be seen in FIGS. 1, 6, and 7, lever arms 50c are mounted on ramp ring 50 to provide attachment points for the rotation means 80 which will rotate the ramp ring 50 as required. The rotation means 80 mounts via brackets 80e and 100e on platform 100c of cart D and includes one or more flu-id pressure units 80a, such as hydraulic cylinder assemblies, each of which is oriented tangentially with respect to the ramp ring (50) and attached to a sliding block 80b which slides in guide 80c and to which pin 80d is attached. When cover C is mounted on vessel V, as platform 100c is raised to support cover C, pins 80d will engage slots 50d in lever arms 50c. An identical set of lever arms are mounted on lock ring 30, and identical fluid cylinders are mounted on platform 100c for the purpose of rotating lock ring 30, but this equipment is omitted from the Figures for the sake of clarity.

The cover assembly C is attached to vessel V by means of a plurality of connector pin assemblies generally indicated as 60 in FIG. 2. Each connector pin 60 has threads 60a on one end, onto which nut 60b is threaded. On the end of connector pin 60 distal from threads 60a is head 60e. Each connector pin 60 extends through a hole 5a in vessel flange 5, through force ring hole 20f in force ring 20, and through lock ring hole 30a in lock ring 30. Machined into connector pin 60 near threads 60a is shoulder 60c. Shims 65 are positioned between the shoulder 60c and the vessel flange 5 in order to set the axial position of connector pin 60. Machined into connector pin 60 near head 60e is shoulder 60d which maintains the radial alignment of connector pin 60 relative to force ring hole 20f and lock ring hole 30a. Provided in pin head 60e is hole 60f into which anti-rotation key 60g, which can be seen in FIG. 3, is inserted.

The operation of the preferred embodiment will now be described. As seen in FIG. 1, a cart D can be used to move the vessel cover positioner C into general alignment with the vessel opening. Cart D then raises the vessel cover positioner C into contact with the vessel flange 5. As seen in FIG. 2, the vessel cover 10 contacts the gasket 15 at the perimeter of the opening. Simultaneously, connector pin 60 passes through corresponding holes 20f and 30a in the force ring 20 and the lock ring 30. The connector pin 60 is attached to vessel flange 5 by nut 60b with the axial alignment being maintained by shims 65 between the vessel flange 5 and the shoulder 60c. This axial alignment is set so that the lock ring 30 will have clearance to fit between the force ring 20 and the connector pin head 60e while maintaining the optimum travel of the cover 10 during the final attachment step. The shoulder 60d on connector pin 60 radially aligns connector pin 60 with hole 20f in force ring 20. As seen in FIG. 4, lock ring 30 has keyhole shaped openings 30a which have large diameter l and small diameter s. Large diameter l is slightly larger than the diameter of connector pin head 60e and small diameter s is smaller than the diameter of connector pin head 60e but slightly larger than the diameter of the shank of connector pin 60.

After the vessel cover positioner C has been raised to the point where the cover 10 contacts the gasket 15, the lock ring 30, which is supported by support lugs 32, is rotated so that small diameter s portion of lock ring opening 30a contacts the shank of connector pin 60. This operation locks connector pin head 60e behind lock ring 30 which therefore can support force ring 20 against connector pin head 60e. As seen in FIG. 5, safety latch 25 is pivotally mounted by pivot pin 20e on force ring 20. Latch pin 30b is mounted on lock ring 30 so that when lock ring 30 is rotated to lock connector pin head 60e, latch pin 30b moves to the end of slot 25a in safety latch 25 causing safety latch 25 to rotate until end 25b of safety latch 25 clears latch lug 50b which is mounted on ramp ring 50. This insures that ramp ring 50 will not be rotated unless lock ring 30 is fully rotated to its locking position.

Referring again to FIG. 2, after lock ring 30 is rotated into its locking position behind connector pin head 60e, fluid pressure is applied via tube 40d to force actuator 40. This pressurizes via passage 40e in pressure housing 40c both inner annular ring 40a and outer annular ring 40b. Under pressure, pressure housing 40c and rings 40a and 40b expand, reacting against force ring 20 which is held in place by lock ring 30 and connector pins 60. This results in a force against cover 10 pressing it firmly against gasket 15. In order to prevent permanent deformation of rings 40a and 40b, the travel of cover 10 is limited by the adjustment of nut 20c on stud 20b. Expansion of the annular rings 40a and 40b serves to substantially uniformly prestress the pins 60 to desired magnitude as a group, which also serves to prestress the cover. The advantage of prestressing, as is known in the art, is to serve to load the pins and cover so as to maintain a desired pre-load even under the stress of operation. Referring to FIG. 5, it can be seen that in its initial position, ramp ring 50 does not contact the ramps on cover 10. Referring to FIG. 3, after lock ring 30 is rotated into place and after force actuator 40, not shown in FIG. 3, is pressurized, ramp ring 50 is rotated until ramps 50a firmly contact ramps 10b on cover 10. The angle of inclination of these ramps is sufficiently shallow that friction between ramp ring 50 and cover 10 prevents the relative rotation of either part.

Referring again to FIG. 2, after ramp ring 50 is rotated into place, force actuator 40 is depressurized, allowing pressure housing 40c and rings 40a and 40b to return to their original shape. The apparatus remains in this condition until removal is required, at which time force actuator 40 is first pressurized then ramp ring 50 is rotated until it no longer contacts cover 10 then force actuator 40 is depressurized and lock ring 30 is rotated until connector pin heads 60e can pass through. At this point, cart D can remove the apparatus from the vessel.

These removal and replacement operations can be performed manually, however, the greatest utility of the invention can be achieved by using power devices such as pneumatic or hydraulic cylinders 80a, shown in FIG. 1, engaging lever arms 50c which are attached to ramp ring 50. Similar devices can be used to rotate lock ring 30 but they are not shown. Referring to FIGS. 6 and 7, the piston of cylinder 80a is attached to sliding block 80b upon which is mounted pin 80d. Block 80b slides in guide 80c which along with cylinder 80a is mounted on platform 100c. When the vessel cover positioner is supported by cart D, pin 80d protrudes through slot 50d in lever arm 50c, which is attached to ramp ring 50. When cylinder 80a is activated it will move block 80b and pin 80d to rotate ramp ring 50 in the direction desired to engage or disengage. As pointed out before, the same system attached to lock ring 30 can be used to lock or unlock connector pins 60. This will allow the entire operation to be conducted in remote which can be desirable when the vessel is at a comparatively high temperature. In order to prevent heat damage to the fluid equipment such as cylinder 80a, this equipment has been mounted on cart D which is withdrawn during the operation cycle of the vessel. When cart D is brought back into place under the vessel cover positioner and raised to support the vessel cover positioner in preparation for removal from the vessel, pin 80d will again engage slot 50d in lever arm 50c. The systems of this invention allows opening and closing of heavy vessel covers without exposing personnel to the dangers of vessel contents which may be at dangerous pressure and temperature or which may be toxic.

The foregoing disclosure and description of the invention are illustrative and explanatory thereof, and various changes in the size, shape and materials, as well as in the details of the illustrated construction may be made without departing from the spirit of the invention. For example, even though the invention has been described for a vessel which is vertically oriented having a bottom opening, it is within the skill of the art to apply this invention to a variety of vessel structures with other orientations and cover positions and configurations. Further, the term "fluid" as used herein may be either a gas or a hydraulic-type liquid.

What is claimed is:

1. A remotely operable vessel cover positioner in combination with a vessel for remotely connecting and disconnecting a vessel cover to and from the vessel wherein the vessel includes an opening, a mounting rim surrounding the opening and a cover having a perimeter sized to fit against the mounting rim to provide a closure over the vessel opening, comprising;

a plurality of connector pins affixed to and extending outwardly from the vessel mounting rim;

initial cover positioning means supporting the cover for moving the cover to and from an initial position in which the cover is substantially adjacent to and aligned with the vessel mounting rim;

pin connection means having a first portion attached to the cover on a side of the cover opposite from the mounting rim, said first portion having openings therein into which the pins extend when the cover is moved into the inital position, and a second portion which is movable relative to the first portion for interlocking the pins extending into the openings in the first portion with the first portion and thereby locking the cover in the initial position;

final positioning means disposed substanatially between the cover and the pin connection means for moving the cover from the initial locked position into a desired final position against the vessel rim and for prestressing the connector pins interlocked with the pin connection means; and final position lock means, disposed substantially adjacent the final positioning means between the cover and the pin connection means, movable relative to the cover from an initial position to a final locking position for locking the cover in the desired final position in which the connector pins are prestressed.

2. A combination as described in claim 1, wherein the initial cover positioning means is separate from the vessel.

3. A combination as described in claim 1, wherein the second portion of the pin connection means includes a fluid actuated device attached thereto for moving the second portion relative to the first portion of the pin connection means.

4. A combination as described in claim 1, wherein the final positioning means comprises fluid actuated expanding means disposed between the cover and the pin connection means for expanding in size to thereby move the cover from the inital locked position into the desired final position against the vessel rim.

5. A combination as described in claim 1, wherein the final position lock means includes fluid actuated means attached thereto for moving the final position lock means to the final locking position.

6. A remotely operable vessel cover positioner for remotely connecting and disconnecting a vessel cover from a vessel, comprising:
- a vessel having a circular opening surrounded by a circular mounting rim;
- a circular vessel cover having a perimeter sized to fit against the mounting rim;
- a cart capable of moving the vessel cover to and from an initial position substantially adjacent to the vessel mounting rim;
- a force ring attached to the cover near the perimeter of the cover with the cover being between the force ring and the mounting rim and having a perimeter with a plurality of opening extending therethrough;
- ramps formed at the perimeter of the cover on a side of the cover adjacent the force ring;
- a plurality of connector pins attached to and extending outwardly from the vessel mounting rim in circumferential spacing around the mounting rim; each of the connector pins extending through an opening of the plurality of openings extending through the force ring when the cover is moved to the initial position;
- a lock ring rotatably attached to the force ring, with the force ring between the lock ring and the cover, for rotation relative to the connector pins to lock the connector pins extending through the openings in the force ring to the force ring to restrain the cover in the initial position;
- a force actuator disposed between a portion of the force ring and portion of the cover, for expanding under fluid pressure to react against the force ring and place the locked connector pins in a prestressed condition and to press the cover against the vessel opening; and
- a ramp ring rotatably supported by the force ring alongside the force actuator between the portion of the force ring and the portion of the cover, the ramp ring being flat on a side next to the force ring and having a series of ramps on a side next to the cover, wherein each of the ramps on the ramp ring is positioned so as to match a ramp of the ramps on the cover by rotation of the ramp ring relative to the cover to hold the cover against the vessel opening.

7. A remotely operable vessel cover positioner as described in claim 6, further comprising:
- a lever arm mounted on the lock ring;
- a lock ring fluid cylinder mounted on the cart and oriented tangentially to the lock ring for engaging the lock ring lever arm and rotating the lock ring relative to the connector pins.

8. A remotely operable vessel cover positioner as described in claim 6, further comprising:
- a lever arm mounted on the ramp ring;
- a ramp ring fluid cylinder mounted on the cart and oriented tangentially to the ramp ring for engaging the ramp ring lever arm and rotating the ramp ring relative to the cover.

9. A remotely operable vessel cover positioner as described in claim 6, wherein each of the connector pins comprises:
- a connector pin shaft;
- a head on each connector pin shaft distal from the end attached to the vessel mounting rim;
- a first shoulder on each connector pin shaft near the vessel mounting rim under which shims can be placed to axially position the connector pin head; and
- a second shoulder on each connector pin shaft near the head to radially position the connector pin shaft of each of the connector pins within the respective opening in the force ring through which it extends.

10. A remotely operable vessel cover positioner as described in claim 9, wherein each opening of the plurality of lock ring openings comprises:
- a large diameter portion and a horizontally adjacent small diameter portion;
- the large diameter portion of each lock ring opening being sufficient for the connector pin head to pass through; and
- the small diameter portion of each lock ring opening being smaller than the connector pin head but larger than the connector pin shaft, whereby, the lock ring is rotated relative to the connector pins by alignment of the small diameter portions with the connector pin shafts, between the pin heads and the second shoulders on each of the connector pins.

11. A remotely operable vessel cover positioner as described in claim 6, wherein the force actuator comprises:
- a metal hollow annular member having an outer annular diameter slightly less than an outer diameter of the cover for expanding transversely in response to receipt of fluid pressure;
- said cover portion including a recess facing the force ring portion in which the annular member is disposed; and
- means for supplying pressurized fluid to the interior of the annular ring.

12. A remotely operable vessel cover positioner as described in claim 6, wherein the force actuator comprises:
- a first hollow annular member of tubular cross-section, with a ring diameter slightly less than an outer diameter of the cover;
- a second hollow annular member of tubular cross-section, with a ring diameter slightly less than the ring diameter of the first annular ring, positioned concentric and co-planar with the first annular ring;
- an annular shaped pressure housing positioned between and attached to both hollow annular rings, having an internal passage to distribute fluid pressure to the first and second rings; and
- means for supplying pressurized fluid to the internal passage of the pressure housing to cause said first and second hollow annular members to expand.

13. A remotely operable vessel cover positioner as described in claim 6, further comprising:
- a safety latch pivotally mounted on the force ring and having a first end with a slot formed therein and an opposing second end;
- a latch lug mounted on the ramp ring for engaging the second end of the safety latch; and
- a latch pin on the lock ring for engaging the slot in the first end of the safety latch whereby when the lock ring is rotated relative to the connector pins, the safety latch pivots until it clears the latch lug on the ramp ring, allowing the ramp ring to be rotated.

14. A remotely operable vessel cover positioner as described in claim 6, wherein the vessel comprises a coke oven.

* * * * *